| United States Patent [19] | [11] | 4,140,822 |
|---|---|---|
| Dratz | [45] | Feb. 20, 1979 |

[54] SURFACE COATING OF POLYOLEFIN FILM

[75] Inventor: Richard A. Dratz, Appleton, Wis.

[73] Assignee: Thilmany Pulp & Paper Company, Kaukauna, Wis.

[21] Appl. No.: 833,002

[22] Filed: Sep. 14, 1977

[51] Int. Cl.² .............................................. B05D 3/02
[52] U.S. Cl. ............................. 427/385 B; 252/313 R; 427/261; 427/372 R; 427/383 R; 427/419 R; 427/428; 428/341; 428/516
[58] Field of Search .................... 427/385 B, 371, 261, 427/, 383 R, 223, 372 R, 419, 428; 428/341, 523, 516; 252/313 R

[56] References Cited

U.S. PATENT DOCUMENTS

| 3,146,883 | 9/1964 | Harlan et al. ..................... 427/261 X |
| 3,450,557 | 6/1969 | Dratz et al. ................... 260/29.6 NR |
| 3,857,723 | 12/1974 | Haskell et al. ..................... 427/223 X |

*Primary Examiner*—Ronald H. Smith
*Assistant Examiner*—Thurman K. Page
*Attorney, Agent, or Firm*—Fitch, Even, Tabin & Luedeka

[57] ABSTRACT

A method for manufacturing a coated, paintable, ink receptive and glueable polyolefin film. A polyolefin film is uniformly coated with an aqueous dispersion comprising aluminum chlorhydroxide, phosphoric acid and high molecular weight polyvinyl alcohol.

6 Claims, No Drawings

SURFACE COATING OF POLYOLEFIN FILM

The present invention is directed to a method for enhancing paintability, printing and gluing properties of polyolefin films in the form of webs or sheets and more particularly is directed to a method for the provision of supported or unsupported polyolefin film material having an adherent coating which provides the polyolefin film with improved paint and ink receptive, glueable and mar resistance properties.

It is known that polyolefin film surfaces are not generally paint and ink-receptive or glueable. The poor print acceptance and ink retention of polyolefin films has been a problem to the packaging industry for a considerable time and much effort has been expended to solve this problem. The problem is particularly accentuated since it is generally desired to apply ink through the use of high speed equipment and to employ rapid setting ink. Adhesivity of such inks is difficult for many surfaces and is particularly deficient in respect to polyolefin surfaces. Moreover, any inked indicia applied to polyolefin surfaces can be readily disrupted by normal abrasive forces encountered during handling or use.

The poor paint acceptance of polyolefin films results in cracking and peeling of paint from the surface. Furthermore, the paint is readily subject to abrasion which removes it from the surface leaving an undesired appearance. On the other hand, firm adherence to paint of polyolefin films is of considerable commercial advantage.

It is also difficult to glue polyolefin film materials with conventional or labelling type glues, such as low cost starch base glues.

Various methods have been developed for the treatment of polyolefin films to enhance the ink receptivity and glueability of the film surface. One method is described in U.S. Pat. No. 3,916,063 to Dratz et al. In the method of the Dratz patent a lightweight adherent, printable, glueable overcoat is applied to a polyolefin web. The overcoat is provided by the application and subsequent drying and curing of an aqueous coating solution of a stabilized amino-formaldehyde, polyvinyl alcohol polymer composition containing a catalyst therefor. Another method involves the oxidation of the polyolefin film surface by irradiation, corona discharge or heat treatment. The oxidation methods have various disadvantages and do not substantially improve the mar resistance or the glueability of the polyolefin film, thereby requiring light printing pressures or special glues to provide the desired results.

Another approach is described in U.S. Pat. No. 3,450,557 to Dratz et al. This patent is directed to a coating composition which comprises polyvinyl alcohol and polyethylenimine. This patent has particular application in respect to supported polyolefin webs which are subsequently coated with the polyvinyl alcohol composition. Processing parameters and conditions for this type of process provide the capabilities for extended drying time of the applied coating and the extended drying times permitted in some applications is acceptable.

However, because of reasons of economy it is desirable to provide a coating which can be cured and dried in relatively short periods. It is also advantageous to apply the coating in an on-machine process such as by application of a coating at a station adjacent the polyolefin extruder and to effect drying of the coating by high-velocity drying equipment adjacent the coating station. Drying of polyvinyl alcohol polyethylenimine compositions by themselves is achieved with difficulty and maximum operating speed is difficult to attain under such circumstances. Moreover, the elevated temperatures required to dry the coating completely in a short run equipment configuration also have a tendency to injure or disrupt the polyolefin web surface.

U.S. Pat. No. 3,629,177 to Hoffmann discloses a water soluble surface finishing composition comprising an aqueous solution of a stabilized, water soluble urea-formaldehyde, vinyl alcohol polymer. These materials are not taught to be suitable for application to polyolefin film surfaces at light-weight application levels.

U.S. Pat. No. 3,857,723 to Haskell et al describes a method for coating polymeric objects, such as films, with aluminum orthophosphate of a specific atom ratio. The process disclosed utilizes an aqueous dispersion of phosphoric acid and aluminum chlorhydroxide. The purpose of the Haskell et al patent is to provide a coating on polymeric object surfaces to improve the moisture vapor transfer properties and the resistance to oxygen permeability. The Haskell et al patent is not directed to providing a surface on polyolefin films which is ink receptive, printable, paintable and glueable. Moreover, the aqueous dispersions of aluminum chlorhydroxide and phosphoric acid disclosed in the Haskell et al patent are extremely difficult to apply to the surface of polyolefin films at very low coating weights. The present invention is directed to an improvement of the coating composition and processes disclosed in the Haskell et al patent to enable the coating compositions to be applied at very low coating weights with particular high speed application equipment.

It is a principal object of the present invention to provide an ink receptive and glueable polyolefin film article. It is an additional object of the present invention to provide a method for the production of paintable, printable, glueable polyolefin coated films which is particularly adapted for operation in high-speed equipment having a relatively short drying run. It is another object of the present invention to provide a method which is suitable for providing polyolefin films with a paintable, printable, glueable and flexible coating comprising aluminum orthophosphate consistent with high-speed operation.

These and other objects of the invention will become more apparent from the following detailed description.

Generally, the present invention is directed to a method for manufacturing a coated, ink receptive, glueable polyolefin film. As used herein, the term "polyolefin" is defined as a film forming polymer of one or more straight or branched chain lower aliphatic alkenes. Specifically included in the term "polyolefin" as examples of film-forming polymers are polyethylene, polypropylene, polyalphabutylene and polyisopropylene.

The polyolefin film may be prepared by any conventional method and such conventional methods are well known in the art. Such conventional methods include sheet extrusion, with or without unilateral or bilateral axial orientation, blow molding extrusion and casting. The polyolefin film may be either supported or unsupported.

For the preparation of supported polyolefin films, the polyolefin film may be extruded or otherwise adhered directly to a substrate material such as paper, metal foil or other polymer. The polyolefin film may also be a composite film in which the film is provided with multiple layers of different polymer constituents.

The various polymer film materials may optionally contain one or more additives such as slip agents, antistatic agents, chill roll release agents, pigments, and other additives which are conventionally employed in the manufacture of polyolefin film materials.

The surface of the polyolefin materials to which the coating of the present invention is to be applied may also optionally be subjected to oxidation treatment, such as corona discharge tretment, if desired. A supporting substrate may be applied to the polyolefin film either before or after the surface of the polyolefin film is coated with the ink receptive and paintable, glueable coating of the present invention.

In accordance with the present invention, the polyolefin film is uniformly coated with an aqueous dispersion comprising aluminum chlorhydroxide, phosphoric acid and high molecular weight polyvinyl alcohol. The polyolefin film may be coated on one or both surfaces if unsupported, and if it is provided with a paper, foil, polymer or other support material prior to the coating step, will generally be coated on only its exposed surface.

The aqueous dispersion is applied to the surface of the polyolefin film at a level sufficient to provide a coating level, on a dry solid basis, which is in the range of from about 0.03 to about 0.75 pounds per ream (3000 sq. ft.) and preferably will be in the range of from about 0.05 to about 0.5 pounds per ream of the polyolefin material, per coated surface of the film.

The aqueous dispersion is prepared by dissolving the phosphoric acid and aluminum chlorhydroxide in separate portions of the water to be used in preparing the disperion. The high molecular weight polyvinyl alcohol is dissolved in the water prior to adding the phosphoric acid or the aluminum chlorhydroxide thereto. By "aluminum chlorhydroxide" is meant the compound $Al_2(OH)_5Cl$ or mixtures of aluminum hydroxide and hydrochloric acid wherein the atom ratio of chlorine to aluminum is between about 0.2 to 1 and 0.7 to 1. The aluminum chlorhydroxide and phosphoric acid can be added in quantities which result in atom ratios of aluminum to phosphorous within a wide range, preferably from about 0.3 to about 1.5.

By "high molecular weight polyvinyl alcohol" is meant a resin made by the hydrolysis of polyvinyl acetate and having a molecular weight of at least about 100,00 cps preferably from about 115,000 cps to about 125,000 cps. The polyvinyl alcohol useful in the present invention has as acetate content of less that about 25 percent and preferably is fully hydrolysed.

The concentration of the dispersion is not critical to the invention. In general, the dispersions have a solids content provided by the reaction products on the phosphoric acid and aluminum chlorhydroxide of less than about eight percent, preferably from about three to about five percent. At concentrations above about eight percent the ultimate viscosity of the dispersions becomes too great to use with conventional application equipment. The concentration must be greater than about two percent by weight of solids to provide the desired level of coating on the polyolefin film. At the concentration limits contemplated by the present invention, that is, a concentration of from about two to about eight percent of phosphoric acid and aluminum chlorhydroxide solids, the pH of the dispersion is from about 1.7 to about 2.2. The polyvinyl alcohol is used to increase the viscosity of the dispersion to a level which is consistant with the use of low level application coating equipment. In this connection it is desirable to use transfer coating rolls or Mayer rods to apply the dispersion. The use of doctor rolls wherein a dispersion is applied at a relatively high level and is "doctored" from the roll is not suitable for the present invention where it is desired to apply a very thin coating which can be monomolecular. The use of the high molecular weight polyvinyl alcohol in accordance with the present invention at a level of from about 0.25 to about 0.5 percent by weight of the dispersion provides a dispersion with a viscosity in the range of from about 5 to about 10 cps. Such viscosity is suitable for use with transfer coating and Mayer rod application equipment.

The polyvinyl alcohol portion of the dispersion is also useful to provide a more flexible coating which is highly desirable for flexible polyolefin films. In this connection, it has been determined that the high molecular weight polyvinyl alcohol used in the present invention is the only viscosity building agent which is adaptable to be used in the low pH environment of the coating dispersion of the present invention. Other viscosity building agents, such as polyvinylpyrrolidone tend to "kick out" of solution at the low viscosity utilized in the coating composition of the invention.

The dispersion can also contain additives such as resins that improve the wettability and adhesion of the coatings to the polyolefin film to which they are applied. Additives which have been found to be useful include melamine formaldehyde resins, urea formaldehyde resins, and amino acids such as glycine and alanine alone or in combination. Particular resins that can be used include Accobond 3524, trimethylolmelamine modified with iminobispropylamine: Cymel 300 hexamethoxymethylmelamine: and Cymel 450 melamine/-formaldyhyde resin. Accobond 3524 is particularly preferred because of its wetting characteristics coupled with its protection of coating barrier properties upon heating. In general, the additives can be used at a level of up to about 50 percent by weight of the phosphate present in the dispersion. The additive is preferably added to the dispersion after the addition of the phosphoric acid and before the addition of the aluminum ion.

After application of the dispersion, the coated polyolefin film is dried at elevated temperatures to remove excess water from the dispersion. Drying time and temperatures can be varied over a wide range, depending, for example, on the composition of the polyolefin film, the chemical composition of the coating, the concentration of the coating, the coating thickness, and the air flow in the dryer. The coated polyolefin film is conveniently dried by passing through a hot air tunnel with countercurrent airflow.

The coatings applied from the aqueous dispersion are dried under time and temperature conditions sufficient to remove the water present in the dispersion at the time that it is applied to the polyolefin film plus by-product HCl. After drying, the continuity of the coating can be tested by overall application of an indicator solution of iodine, boric acid and potassium iodide in water which turns light purple in contact with the polyvinyl alcohol in the coating.

The following example further illustrates various features of the present invention, but are intended to in no way limit the scope of the invention which is defined in the appended claim.

EXAMPLE

A solution of polyvinyl alcohol in water was prepared. One quarter pound of Vinol 165 (high molecular weight, polyvinyl alcohol, manufactured by Air Products Company, Inc.) was added to 100 pounds of water and the mixture was heated to a temperature of 195° F with stirring. The polyvinyl alcohol solution was divided into two equal parts, referred to as part A and part B. 3.1 pounds of 50 percent aluminum chlorhydroxide (manufactured under the trade name Chlorohydrol by Reheis Division, Armour & Company) was added to part A with stirring. 3.6 pounds of 85 percent phosphoric acid and 0.7 pounds of Accobond 3524 resin was added to part B with stirring. Part A was then combined with Part B to form an aluminum orthophosphate colloidal dispersion of aluminum orthophosphate in situ. The dispersion had an aluminum/phosphorous ratio of 0.45. The dispersion was applied to a polyethylene film having a thickness of ¾ mils by means of a transfer roll. The dispersion was applied at a level sufficient to provide 0.03 pounds of aluminum orthophosphate, dry basis, per ream of the polyethylene film.

The coated film was dried in a hot air tunnel with counter current air flow having an initial temperature of 375° F and supplied at a rate of 5 cubic feet per square foot of film.

After drying and cooling, it was found that the coating was well anchored to the polyethylene surface and showed excellent resistance to removal by the conventional Scotch Tape adhesion test. The resulting light weight coating permitted application and excellent adhesion of a variety of conventional water base and solvent base inks. The inks also resisted removal by the Scotch Tape test. Latex, solvent base and enamel paints also adhere well and resist removal by boiling water for more than 30 minutes.

Although certain of the features of the invention have been set forth with particularity in order to accurately describe the invention, alternatives which do not depart from the spirit of the invention are also contemplated.

Various features of the present invention are set forth in the following claims:

What is claimed is:

1. A method for providing a printable, glueable and paintable coating on at least one surface of polyolefin films comprising providing an aqueous dispersion of aluminum chlorhydroxide, phosphoric acid and polyvinyl alcohol, said aluminum chlorhydroxide and said phosphoric acid being present at a level such that the solids content provided by the reaction products of the aluminum chlorhydroxide and phosphoric acid are less than about 8 percent by weight of said dispersion, said polyvinyl alcohol being present at a level of from about 0.25 to about 0.50 percent by weight of said dispersion, applying said dispersion to at least one surface of a polyolefin film at a level sufficient to yield a dried coating weight of from about 0.03 to about 0.75 pounds per ream and drying the coated film.

2. A method in accordance with claim 1 wherein said polyvinylalcohol has a molecular weight of at least about 100,000 cps.

3. A method in accordance with claim 1 wherein said aluminum chlorhydroxide and said phosphoric acid are present at a level such that the solids content provided by the reaction products of the aluminum chlorhydroxide and phosphoric acid are from about 3 to about 5 percent.

4. A method in accordance with claim 1 wherein said aluminum chlorhydroxide and said phosphoric acid are present in quantities which result in atom ratios of aluminum to phosphorus within the range of from about 0.3 to about 1.5.

5. A method in accordance with claim 1 wherein said dispersion is applied to the surface of said polyolefin film by means of a transfer roll.

6. A method in accordance with claim 1 wherein said polyolefin is polyethylene.

* * * * *

UNITED STATES PATENT AND TRADEMARK OFFICE
CERTIFICATE OF CORRECTION

PATENT NO. : 4,140,822
DATED : February 20, 1979
INVENTOR(S) : Richard A. Dratz

It is certified that error appears in the above-identified patent and that said Letters Patent are hereby corrected as shown below:

Under References Cited, add:

3,280,050   10/1966   Johnson          260/29.6 WA-XR 3,708,388   1/1973    Lindemann et al  260/29.6 WA-XR Column 3, line 49, "100,00 cps" should be --100,000 cps--

Signed and Sealed this

Twelfth Day of June 1979

[SEAL]

Attest:

RUTH C. MASON
*Attesting Officer*

DONALD W. BANNER
*Commissioner of Patents and Trademarks*